United States Patent
Krattiger

(10) Patent No.: US 11,122,657 B2
(45) Date of Patent: Sep. 14, 2021

(54) HIGH PERFORMANCE DIMMING BASED ON DIMMER SLEW-RATE

(71) Applicant: ERP POWER, LLC, Moorpark, CA (US)

(72) Inventor: Steven C. Krattiger, Northridge, CA (US)

(73) Assignee: ERR POWER, LLC, Moorpark, CA (US)

(*) Notice: Subject to any disclaimer, the term of this patent is extended or adjusted under 35 U.S.C. 154(b) by 0 days.

(21) Appl. No.: 16/905,407

(22) Filed: Jun. 18, 2020

(65) Prior Publication Data
US 2020/0413509 A1  Dec. 31, 2020

Related U.S. Application Data

(60) Provisional application No. 62/867,027, filed on Jun. 26, 2019.

(51) Int. Cl.
*H05B 45/10* (2020.01)
*H05B 45/325* (2020.01)
*H05B 45/37* (2020.01)

(52) U.S. Cl.
CPC ........... *H05B 45/325* (2020.01); *H05B 45/10* (2020.01)

(58) Field of Classification Search
CPC ...... H05B 45/10; H05B 45/14; H05B 45/325; H05B 45/347; H05B 45/3575; H05B 45/37; H05B 47/10; H05B 47/105; H05B 47/14; H05B 47/17
See application file for complete search history.

(56) References Cited

U.S. PATENT DOCUMENTS

| | | | | |
|---|---|---|---|---|
| 7,667,408 B2* | 2/2010 | Melanson | .............. | H05B 45/37 315/209 R |
| 8,922,135 B2* | 12/2014 | Sumitani | ................ | H05B 33/08 315/297 |
| 10,039,171 B1* | 7/2018 | Li | .......................... | H05B 45/50 |
| 2011/0043133 A1* | 2/2011 | Van Laanen | ...... | H02M 3/33523 315/294 |
| 2014/0049185 A1* | 2/2014 | Neser | .................. | H05B 45/3574 315/250 |
| 2015/0146461 A1* | 5/2015 | Deng | .................. | H02M 7/1557 363/85 |
| 2020/0256521 A1* | 8/2020 | Xiong | ..................... | F21K 9/278 |

* cited by examiner

*Primary Examiner* — Thai Pham
(74) *Attorney, Agent, or Firm* — Lewis Roca Rothgerber Christie LLP

(57) ABSTRACT

A method of controlling a power supply electrically coupled to a dimmer, the method including receiving a plurality of pulse-width-modulated (PWM) pulses corresponding to one or more dimmer levels of the dimmer, generating a first sample value and a second sample value of a plurality of sample values corresponding to duty cycles of the plurality of PWM pulses, determining a rate of change of the one or more dimmer levels based on the first and second sample values, comparing the rate of change with a threshold value to identify a mode of operation of the power supply, and generating a control signal for transmission to the power supply based on the identified mode of operation.

20 Claims, 5 Drawing Sheets

HIGH PERFORMANCE DIMMING BASED ON DIMMER SLEW-RATE

CROSS-REFERENCE TO RELATED APPLICATION(S)

This application claims priority to, and the benefit of, U.S. Provisional Application No. 62/867,027 ("HIGH PERFORMANCE DIMMING BASED ON DIMMER SLEW-RATE"), filed on Jun. 26, 2019, the entire content of which is incorporated herein by reference.

The present application is also related to U.S. patent application Ser. No. 16/905,421, entitled "MULTI-INPUT POWER SUPPLY SYSTEM AND METHOD OF USING THE SAME", filed on Jun. 18, 2020, which claims priority to and the benefit of U.S. Provisional Application No. 62/867,052 ("TRIAC DETECTION SOFTWARE"), filed on Jun. 26, 2019, the entire contents of which are incorporated herein by reference.

The present application is also related to U.S. patent application Ser. No. 16/905,501, entitled "SYSTEM AND METHOD FOR MULTI-SLOPE CONTROL OF LIGHTING INTENSITY", filed on Jun. 18, 2020, which claims priority to and the benefit of U.S. Provisional Application No. 62/867,056 ("MULTI-SLOPE TRIAC CONTROL OF LIGHTING INTENSITY"), filed on Jun. 26, 2019, the entire contents of which are incorporated herein by reference.

The present application is also related to U.S. patent application Ser. No. 16/905,461, entitled "SYSTEM AND METHOD FOR INVALID PULSE REJECTION", filed on Jun. 18, 2020, which claims priority to and the benefit of U.S. Provisional Application No. 62/866,371 ("MISSING PULSE CORRECTION FOR PROGRAMMABLE TRIAC CONTROL DRIVERS"), filed on Jun. 25, 2019, the entire contents of which are incorporated herein by reference.

The present application is also related to U.S. patent application Ser. No. 16/905,438, entitled "DYNAMIC FILTERING FOR SMOOTH DIMMING OF LIGHTS", filed on Jun. 18, 2020, which claims priority to and the benefit of U.S. Provisional Application No. 62/866,392 ("UTILIZING DYNAMIC FILTERING FOR SMOOTH DIMMING OF LIGHTS"), filed on Jun. 25, 2019, the entire contents of which are incorporated herein by reference.

The present application is also related to U.S. patent application Ser. No. 16/905,516, entitled "MOVEMENT-BASED DYNAMIC FILTERING FOR SMOOTH DIMMING OF LIGHTS", filed on Jun. 18, 2020, which claims priority to and the benefit of U.S. Provisional Application No. 62/866,392 ("UTILIZING DYNAMIC FILTERING FOR SMOOTH DIMMING OF LIGHTS"), filed on Jun. 25, 2019, the entire contents of which are incorporated herein by reference.

FIELD

Aspects of the present disclosure are related to a power supply used in conjunction with LED lighting and a method of operating the same.

BACKGROUND

Generally, power-supplies react to dimmer inputs with built-in slow-fade timers, which don't react in real-time to a user's input, but rather they incorporate slow dimming up and down to enhance artistic mood and scenic feel. What is desired a high-performance dimmer that reacts in real-time if it's moved up or down quickly.

The above information disclosed in this Background section is only for enhancement of understanding of the disclosure, and therefore it may contain information that does not form the prior art that is already known to a person of ordinary skill in the art.

SUMMARY

Aspects of embodiments of the present disclosure are directed to a power supply system capable of providing high-performance dimming for LED lighting systems. In some embodiments, the power supply utilizes slew-rate detection to trigger change in performance, and can switch between high-performance dimming and slow scenic dimming as desired.

According to some embodiments of the present disclosure, there is provided a method of controlling a power supply electrically coupled to a dimmer, the method including: receiving a plurality of pulse-width-modulated (PWM) pulses corresponding to one or more dimmer levels of the dimmer; generating a first sample value and a second sample value of a plurality of sample values corresponding to duty cycles of the plurality of PWM pulses; determining a rate of change of the one or more dimmer levels based on the first and second sample values; comparing the rate of change with a threshold value to identify a mode of operation of the power supply; and generating a control signal for transmission to the power supply based on the identified mode of operation.

In some embodiments, the method further includes: receiving a modified AC input signal from the dimmer; and generating a PWM signal based on the modified AC input signal, the PWM signal including the plurality of PWM pulses.

In some embodiments, the duty cycles of the plurality of PWM pulses corresponds to the one or more dimmer levels.

In some embodiments, the threshold value is a value from 3% to 7.5% of a maximum dimmer level per millisecond.

In some embodiments, the comparing the rate of change with the threshold value includes: determining that an absolute value of the rate of change is less than or equal to the threshold value; and identifying the mode of operation as a slow-transition mode.

In some embodiments, the generating the control signal includes: setting a step-rate of the control signal to a first value.

In some embodiments, the first value is from 10 steps/mS to 100 steps/mS.

In some embodiments, the comparing the rate of change with the threshold value includes: determining that an absolute value of the rate of change is greater than the threshold value; and identifying the mode of operation as a rapid-response mode.

In some embodiments, the generating the control signal includes: setting a step-rate of the control signal to a second value.

In some embodiments, the second value is from 500 steps/mS to 2000 steps/mS.

In some embodiments, the control signal includes a plurality of PWM control pulses, and the generating the control signal includes: identifying a slew-rate corresponding to the identified mode of operation; determining duty cycles of the plurality of PWM control pulses based on the slew-rate and the plurality of sample values; and generating the plurality of PWM pulses with the determined duty cycles.

In some embodiments, the power supply is configured to adjust a light intensity of a light source based on the control signal.

According to some embodiments of the present disclosure, there is provided a power supply controller coupled to a power supply, the power supply controller including: a processor; and a processor memory local to the processor, wherein the processor memory has stored thereon instructions that, when executed by the processor, cause the processor to perform: receiving a plurality of pulse-width-modulated (PWM) pulses corresponding to one or more dimmer levels; generating a first sample value and a second sample value of a plurality of sample values corresponding to duty cycles of the plurality of PWM pulses; determining a rate of change of the one or more dimmer levels based on the first and second sample values; comparing the rate of change with a threshold value to identify a mode of operation of the power supply; and generating a control signal for transmission to the power supply based on the identified mode of operation.

In some embodiments, the threshold value is a value from 3% to 7.5% of a maximum dimmer level per millisecond.

In some embodiments, the comparing the rate of change with the threshold value includes: determining that an absolute value of the rate of change is less than or equal to the threshold value; and identifying the mode of operation as a slow-transition mode.

In some embodiments, the generating the control signal includes: setting a step-rate of the control signal to a first value.

In some embodiments, the comparing the rate of change with the threshold value includes: determining that an absolute value of the rate of change is greater than the threshold value; and identifying the mode of operation as a rapid-response mode.

In some embodiments, the generating the control signal includes: setting a step-rate of the control signal to a second value.

According to some embodiments of the present disclosure, there is provided a power supply system coupled to a dimmer and a light source, the power supply system including: a pulse-width-modulated (PWM) converter configured to receive a modified AC input signal from the dimmer, and to generate a PWM signal based on the modified AC input signal, the PWM signal including a plurality of PWM pulses; and a power supply controller is configured to perform: receiving a plurality of pulse-width-modulated (PWM) pulses corresponding to one or more dimmer levels of the dimmer; generating a first sample value and a second sample value of a plurality of sample values corresponding to duty cycles of the plurality of PWM pulses; determining a rate of change of the one or more dimmer levels based on the first and second sample values; comparing the rate of change with a threshold value to identify a mode of operation of the power supply system; and generating a control signal based on the identified mode of operation.

In some embodiments, the power supply system further includes: a power supply configured to drive the light source based on the control signal.

BRIEF DESCRIPTION OF THE DRAWINGS

The accompanying drawings, together with the specification, illustrate example embodiments of the present disclosure, and, together with the description, serve to explain the principles of the present disclosure.

DETAILED DESCRIPTION

The detailed description set forth below is intended as a description of example embodiments of a power supply used in conjunction with LED lighting and a method of operation of the same, provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the spirit and scope of the disclosure. As denoted elsewhere herein, like element numbers are intended to indicate like elements or features.

Aspects of embodiments of the present disclosure allow a power supply to perform in one of two modes, based upon user input. According to some embodiments, the power supply system is configured to detect a slew-rate of a dimmer level, and to change the behavior of the supply output based on how fast or slow the user moves the dimmer.

Figure 1:
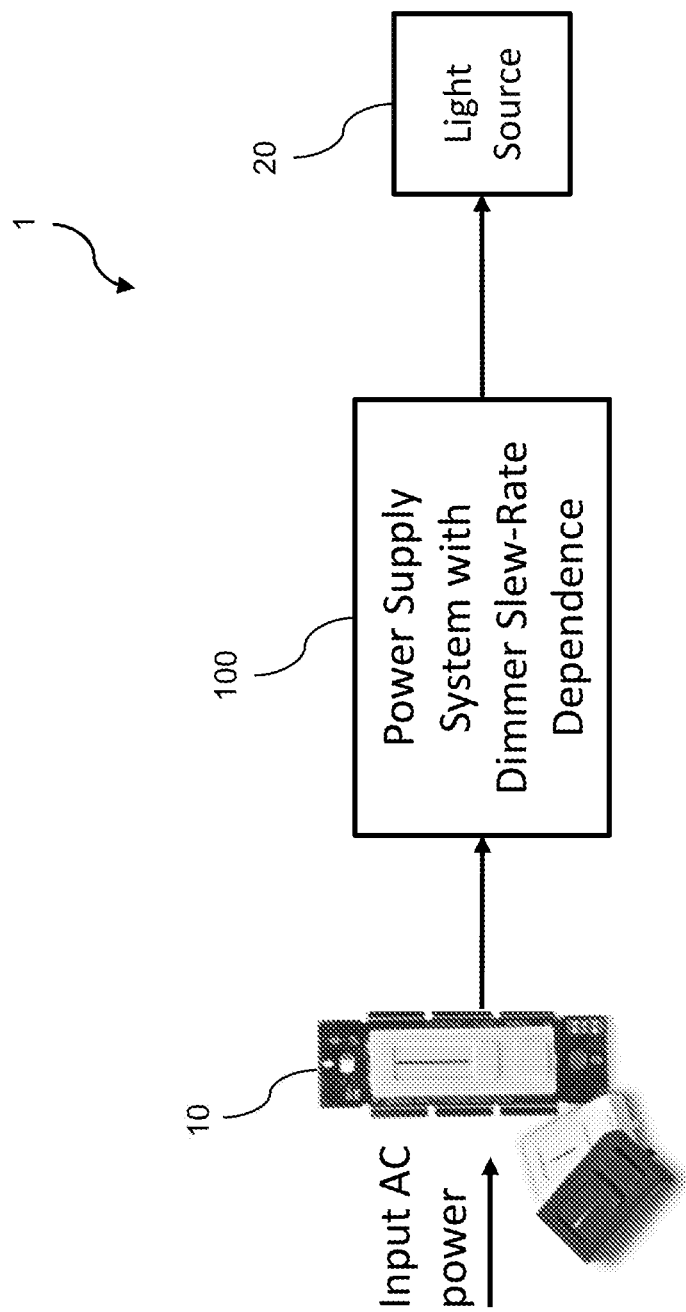
FIG. 1 is a block diagram of a lighting system utilizing a power supply system, according to some embodiments of the present disclosure.

FIG. 1 is a block diagram of a lighting system 1 utilizing the power supply system 100, according to some embodiments of the present disclosure.

The lighting system 1 includes a dimmer (e.g., a phase dimmer) 10, the power supply system 100, and a light source 20. According to some examples, the dimmer interface may be a rocker interface, a tap interface, a slide interface, a rotary interface, or the like. A user may adjust the dimmer level by, for example, adjusting a position of a dimmer lever or a rotation of a rotary dimmer knob, or the like. The dimmer 10 receives an AC input signal (e.g., a 120 V AC signal from the wall) and modifies (e.g., cuts/chops a portion of) the AC input voltage sinewave signal according to the dimmer level before sending it to the power supply system 100, and thus variably reduces the electrical power delivered to the power supply system 100. The power supply system 100 in turn produces a drive signal (e.g., an output current or voltage) that is proportional to the reduced power provided by the dimmer 10 and provides the drive signal to the light source 20. Thus, the light output of the light source 20 may be proportional to the phase angle of the modified sine wave. This results in the dimming of the light output. In some examples, the dimmer 10 may be a TRIAC or ELV dimmer, and may chop the front end or leading edge of the AC input signal. The light source 20 may include one or more light-emitting-diodes (LEDs). In some embodiments, the power supply system 100 is also configured to detect how fast the dimmer level changes and to change the behavior of the supply output based on speed of change. In response to detecting a slow change of dimmer level by the user, the power supply system 100 follows the normal artistic/scenic dimmer timing, and in response to detecting fast change of dimmer level, the power supply system 100 eliminates the dimmer timing, thus allowing the drive signal to follow the user input in real-time. For example, embodiments of the present disclosure enable an LED light to transition from full on to off and vice-versa very rapidly and with little to no transition. In other words, by incorporating a slew-date detection algorithm, the power supply system 100 has the ability to modify its behavior to produce different dimming results.

Figure 2A:
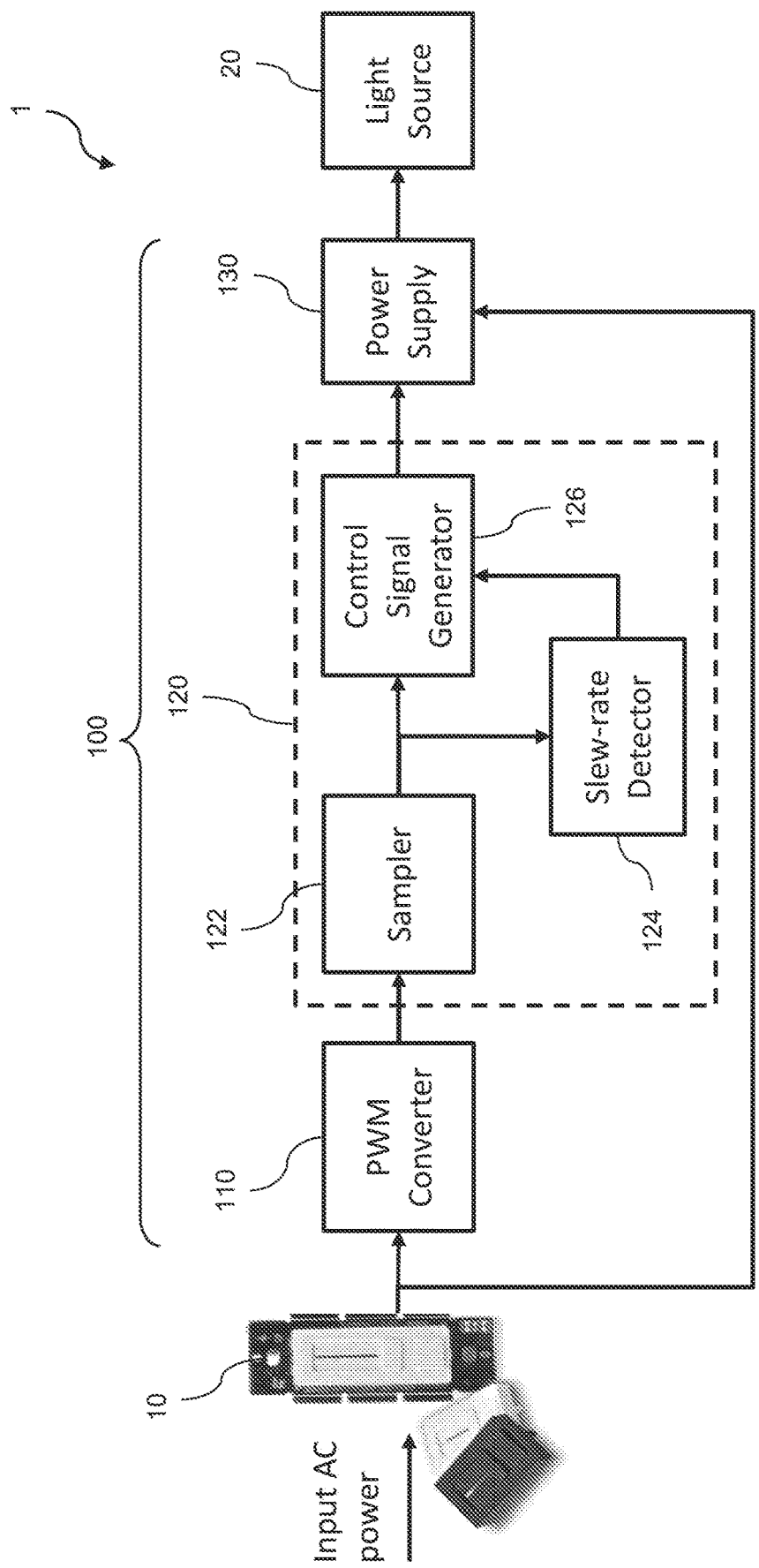
FIG. 2A is block diagram of the power supply system incorporating slew rate dependence within the lighting system, according to some embodiments of the present disclosure.
Figure 2B:
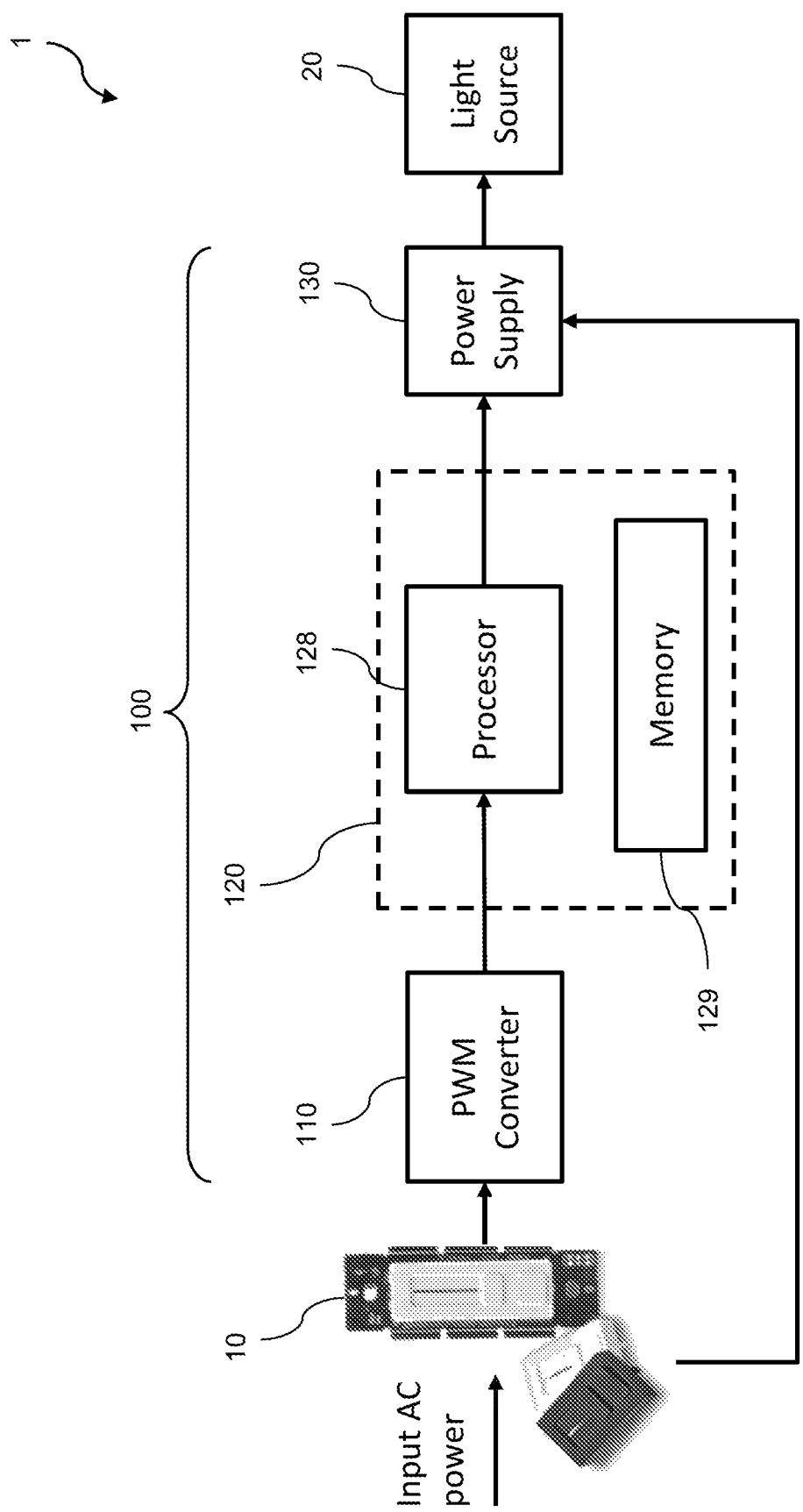
FIG. 2B illustrates the power supply controller implemented as a processor and memory, according to some embodiments of the present disclosure.

FIG. 2A is block diagram of the power supply system 100 incorporating slew rate dependence within the lighting system 1, according to some embodiments of the present disclosure. FIG. 2B illustrates the power supply controller implemented as a processor and memory, according to some embodiments of the present disclosure.

Referring to FIG. 2A, the power supply system 100 includes a PWM converter 110, a power supply controller 120, and a power supply 130.

The PWM converter 110 is configured to convert the modified AC input signal received from the dimmer 10 into a pulse width modulation (PWM) signal (e.g., a PWM input signal) for processing by the power supply controller 120. The PWM converter 110 may include one or more comparators that compare the positive and negative swings of the incoming modified AC input signal with one or more set or predefined thresholds to generate a corresponding PWM signal. Thus, the PWM converter 110 maps the dimmed power of the modified AC input signal to pulse width modulations of the PWM signal. In some examples, the duty cycle of the PWM signal represents the dimmer level (i.e., the user setting at the dimmer 10). In some examples, a high value in the PWM signal may be about 3.3 V, which may correspond to a logic high (or a binary '1'), and a low value may be about 0 V, which may correspond to a logic low (or binary '0').

In some embodiments, the power supply controller 120 is configured to measure (e.g., continuously measure) the duty cycle of the PWM signal and to generate a sequence of sample values, which may correspond to the dimming levels of the dimmer 10 at a plurality of sample times. The power supply controller 120 then generates a control signal based on the sample values, which it provides to the power supply 130.

The power supply 130 in turn generates a drive signal based on the control signal for powering and controlling the brightness of the light source 20. The drive signal may depend on the type of the one or more LEDs of the light source 20. For example, when the one or more LEDs of the light source 20 are constant current LEDs the drive signal may be a variable voltage signal, and when the light source 20 requires constant voltage, the drive signal may be a variable current signal. The power supply 130 may receive its input power from the modified AC signal from the dimmer 10.

According to some embodiments, the power supply controller 120 includes a sampler (e.g., a distortion-rejecting sampler) 122 and control signal generator 126. The sampler 122 measures the duty cycle of each PWM pulse of the received the PWM signal to determine the dimmer level of the dimmer 10 at regular intervals, and generates a plurality of sample values corresponding to the duty cycle of the PWM pulses. Each sample value may a value between 0, which may indicate a 0% duty cycle for a corresponding PWM pulse, and a maximum value, which may indicate a 100% duty cycle for the corresponding PWM pulse. As such, a value of zero may correspond to a minimum brightness setting (e.g., 0% brightness setting) at the dimmer 10, which may indicate, e.g., a user's desire to turn the light source 20 completely off. Further, the maximum value (e.g., 1000 or 10000) may correspond to a maximum brightness setting (e.g., 100% brightness setting) at the dimmer 10, which may indicate, e.g., a user's desire to turn the light source 20 fully on. In other words, each sample value corresponds to a new target setting that a light source 20 should output. The sampling frequency of the sampler 122 may be significantly faster than the speed at which a user can change the dimmer level. For example, the sampling frequency may be about 12 kHz or higher.

In some embodiments, the slew-rate detector 124 is configured to measure a rate of change or slew-rate of the dimmer level. The slew-rate may be expressed by the following equation:

$$\text{Slew-Rate} = \frac{\text{Change in Position}}{\text{Change in Time}} = \frac{\Delta dPos}{\Delta dT} \qquad \text{Equation (1)}$$

The slew-rate detector 124 then compares the slew-rate with a set or predefined threshold value (e.g., a rate-of-change threshold). In some examples, the threshold value may be 3% to 7.5% of a maximum dimmer level per millisecond. In examples in which the dimmer level value can change from 0 to 10,000 counts, the threshold value is a value from 300 counts/mS to 750 counts/mS. As the slew rate may be a positive or negative value, in some examples, the slew-rate detector 122 may compare the absolute value of the determined slew-rate with threshold value, or equivalently, compare positive and negative values of the slew-rate with positive and negative threshold values, respectively.

The slew-rate detector 124 generates a mode-indicator signal based on the comparison of the slew-rate and the threshold and transmits the mode-indicator signal to the control signal generator 126. For example, when the slew-rate of the dimmer level is less than or equal to the threshold, which may indicate a desire by the user for a slow/smooth dimming transition, the slew-rate detector 124 may set the mode-indicator signal to a first value (e.g., a logic low value), thus communicating to the control signal generator to operate in slow-transition mode. When the slew-rate of the dimmer level is above the threshold, which may indicate a desire by the user for quick/immediate dimming response, the slew-rate detector 122 may set the mode-indicator signal to a second value (e.g., a logic high value), thus communicating to the control signal generator 126 to operate in rapid-response mode.

The control signal generator 126 then generates a control signal (e.g., a PWM output control signal) based on the plurality of sample values and the mode of operation (as established by the indicator signal). In some examples, the control signal generator 126 maps the sample values to duty cycles of a plurality of PWM control pulses, according to the mode of operation. Here, the plurality of PWM control pulses together form the control signal. In some examples, the control signal is filtered to produce a smooth PWM analog signal that can be used by the power supply to control the light intensity of the light source 20. However, embodiments of the present disclosure are not limited to PWM control signals, and any suitable modulation scheme may be utilized to control the power supply 130, so long as the power supply 130 is properly designed for such a modulation scheme. Thus, in some examples, the control signal may be a pulse amplitude modulation signal, a pulse frequency modulation signal, or a variable DC signal (e.g., a DC voltage ranging from 0 V to 10 V).

Each new sample value represents a new target value for the control signal generator 126 to reach, and each PWM control pulse represents a step/quantized change in the output of the power supply 130. As the duration of each PWM control pulse is fixed (e.g., about 200 µS) and determined by the signal frequency (e.g., 5 KHz), the slew-rate determines the number of steps it takes to reach the desired target value.

According to some embodiments, the mode of operation determines the step-rate used by the control signal generator 126 to generate the PWM control pulses of the control signal. When the mode of operation identified by the slew-rate detector 124 is a slow-transition mode, the control signal generator 126 sets the step-rate to a first value, which may for example be between 10 steps/mS to 100 steps/mS, to enable a smooth/soft transition in the light output of the light source 20. Therefore, in some examples, setting the step-rate to the first value may result in an overall slow transition time of 1 second or as short as 100 mS for full ON-OFF or OFF-ON transitions. When the mode of operation identified by the slew-rate detector 124 is a rapid-response mode, the control signal generator 126 sets the step-rate to a second value, which may for example be between 500 steps/mS to 2000 steps/mS, to enable a fast/immediate response by the power supply to the rapid change in dimmer levels. Therefore, in some examples, setting the step-rate to the second value may result in a fast transition time of 20 mS or as fast as 5 mS for full ON-OFF or OFF-ON transitions.

In some examples, the control signal generator 126 adjusts the slew-rate by changing the step size for changing the duty cycle of the PWM control pulses. When in slew-rate is at the first value, the step size has a correspondingly small value to allow for gradual changes in duty cycle of the PWM control pulses and the light intensity of the light source 20, and when the slew-rate is the second value, the step size may be increased to a much greater value (e.g., to a maximum step size) to enable the desired target value to be reached almost immediately.

According to some embodiments, the power supply controller 120 includes any combination of hardware, firmware, or software, employed to process data or digital signals. This may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In the power supply controller 120, each function may be performed either by hardware configured, i.e., hard-wired, to perform that function, or by more general purpose hardware, such as a CPU, configured to execute instructions stored in a non-transitory storage medium. The power supply controller 120 may be fabricated on a single printed wiring board (PWB) or distributed over several interconnected PWBs.

As shown in FIG. 2B, in some embodiments, the power supply controller 120 includes a processor 128 and a memory 129. The processor 128 may include, for example, one or more application specific integrated circuits (ASICs), general purpose or special purpose central processing units (CPUs), digital signal processors (DSPs), graphics processing units (GPUs), and programmable logic devices such as field programmable gate arrays (FPGAs). The memory 129 may have instructions stored thereon that, when executed by the processor 128, cause the processor 128 to perform the operations of the sampler 122, the slew-rate detector 124, and a control signal generator 126.

Figure 3:
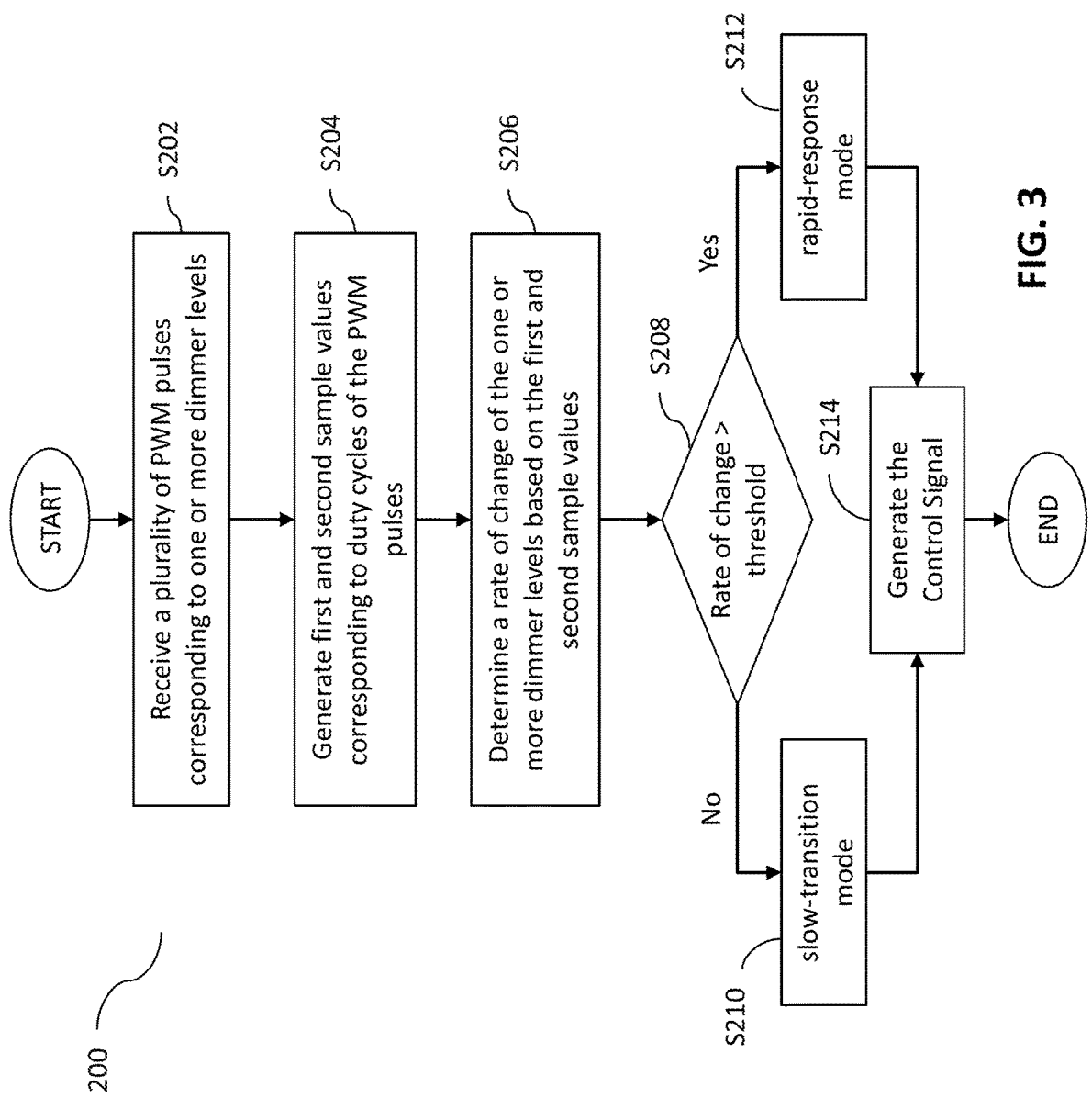
FIG. 3 illustrates a process of controlling a power supply by a power supply controller 120, according to some example embodiments of the present disclosure.

FIG. 3 illustrates a process of controlling a power supply by a power supply controller 120, according to some example embodiments of the present disclosure.

In some embodiments, the power supply controller 120 (e.g., the sampler 122) receives a plurality of PWM pulses from a PWM converter 110 corresponding to one or more dimmer levels of the dimmer 10 (S202), and generates a first sample value and a second sample value of a plurality of sample values corresponding to duty cycles of the plurality of PWM pulses (S204).

In some embodiments, the power supply controller 120 (e.g., the slew-rate detector 124) determines a rate of change of the one or more dimmer levels based on the first and second (and, in some examples, subsequent) sample values (S206), and compares the rate of change with a threshold value to identify a mode of operation of the power supply. As the rate of change may be positive or negative, the power supply controller 120 compares the absolute value of the rate of change with the threshold. However, embodiments of the present disclosure are not limited thereto, and the power supply controller 120 may compare a positive rate of change with a positive threshold and compare a negative rate of change with a negative threshold. Similarly, when the power supply controller 120 determines that the absolute value of the rate of change is less than or equal to the threshold value, it identifies the mode of operation as a slow-transition mode (S210). When the power supply controller 120 determines that the absolute value of the rate of change is greater than the threshold value, it identifies the mode of operation as rapid-response mode (S212).

The power supply controller 120 (e.g., the control signal generator 126) then generates a control signal for transmission to the power supply based on the identified mode of operation (S214). In so doing, the power supply controller 120 identifies a slew-rate corresponding to the identified mode of operation, determines duty cycles of the plurality of PWM control pulses based on the slew-rate and the plurality of sample values, and generates the plurality of PWM pulses with the determined duty cycles.

Figure 4:
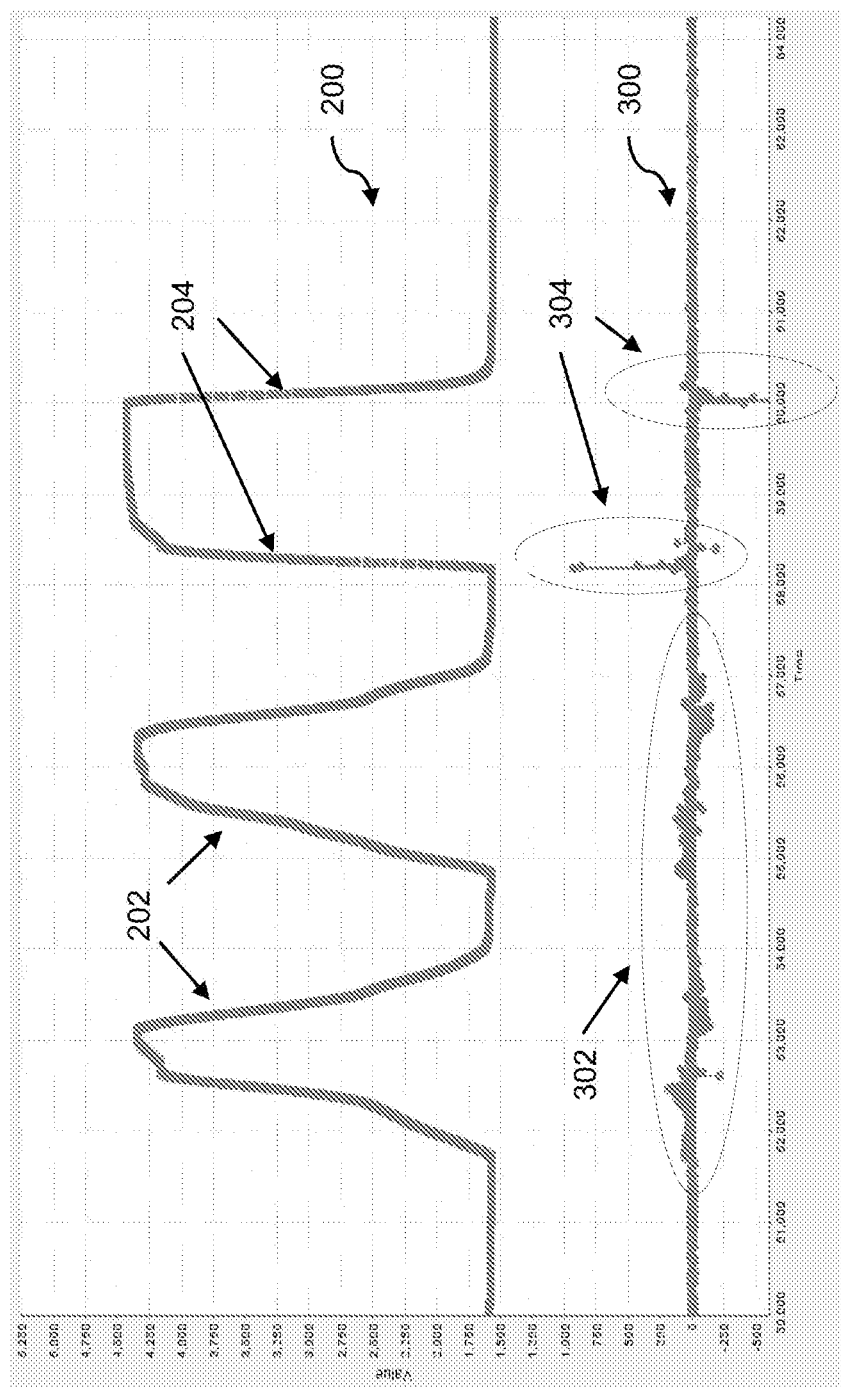
FIG. 4 illustrates a real-time graph indicating movement of a dimmer level, and a slew-rate graph indicating the rate of change of the dimmer level, according to some examples.

FIG. 4 illustrates a real-time graph 200 indicating movement of a dimmer level, and a slew-rate graph 300 indicating the rate of change of the dimmer level, according to some examples.

In FIG. 4, the region 202 of graph 200 shows a gradual change in dimmer level that have corresponding slew rates 302 in graph 300, which have absolute values below a preset threshold, and thus indicate a slow-transition/smooth-transition mode of operation. The region 204 of graph 200 shows rapid changes in the dimmer level that have corresponding slew rates 304, which have absolute values above the preset threshold, and thus indicate a rapid-response/highly reactive mode of operation in which the power supply reaches the dimmer target intensity as fast as possible.

Accordingly, as described herein, a single power supply system according to some embodiments of the present disclosure can produce a dimmable output with smooth lighting transitions and can also produce high performance dimming results if desired. This allows the single power supply system to be used in more installations, and not require the provision of two designs to cover different use cases. Some embodiments of present disclosure can be used in conjunction with constant-current, and constant-voltage supplies.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

The various components of the power supply system may be formed on one integrated circuit (IC) chip or on separate IC chips. Further, the various components of the power supply system may be implemented on a flexible printed circuit film, a tape carrier package (TCP), a printed circuit board (PCB), or formed on the same substrate. Further, the various components of the power supply system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, spirit, and scope of this disclosure, as set forth in the following claims and equivalents thereof.

What is claimed is:

1. A method of controlling a power supply electrically coupled to a dimmer, the method comprising:
   receiving a plurality of pulse-width-modulated (PWM) pulses corresponding to one or more dimmer levels of the dimmer;
   generating a first sample value and a second sample value of a plurality of sample values corresponding to duty cycles of the plurality of PWM pulses;
   determining a rate of change of the one or more dimmer levels based on the first and second sample values;
   comparing the rate of change with a threshold value to identify a mode of operation of the power supply; and
   generating a control signal for transmission to the power supply based on the identified mode of operation.

2. The method of claim 1, further comprising:
   receiving a modified AC input signal from the dimmer; and
   generating a PWM signal based on the modified AC input signal, the PWM signal comprising the plurality of PWM pulses.

3. The method of claim 1, wherein the duty cycles of the plurality of PWM pulses corresponds to the one or more dimmer levels.

4. The method of claim 1, wherein the threshold value is a value from 3% to 7.5% of a maximum dimmer level per millisecond.

5. The method of claim 1, wherein the comparing the rate of change with the threshold value comprises:
   determining that an absolute value of the rate of change is less than or equal to the threshold value; and
   identifying the mode of operation as a slow-transition mode.

6. The method of claim 5, wherein the generating the control signal comprises:
   setting a step-rate of the control signal to a first value.

7. The method of claim 6, wherein the first value is from 10 steps/mS to 100 steps/mS.

8. The method of claim 1, wherein the comparing the rate of change with the threshold value comprises:
   determining that an absolute value of the rate of change is greater than the threshold value; and
   identifying the mode of operation as a rapid-response mode.

9. The method of claim 8, wherein the generating the control signal comprises:
   setting a step-rate of the control signal to a second value.

10. The method of claim 9, wherein the second value is from 500 steps/mS to 2000 steps/mS.

11. The method of claim 1, wherein the control signal comprises a plurality of PWM control pulses, and wherein the generating the control signal comprises:
  identifying a slew-rate corresponding to the identified mode of operation;
  determining duty cycles of the plurality of PWM control pulses based on the slew-rate and the plurality of sample values; and
  generating the plurality of PWM pulses with the determined duty cycles.

12. The method of claim 1, wherein the power supply is configured to adjust a light intensity of a light source based on the control signal.

13. A power supply controller coupled to a power supply, the power supply controller comprising:
  a processor; and
  a processor memory local to the processor, wherein the processor memory has stored thereon instructions that, when executed by the processor, cause the processor to perform:
    receiving a plurality of pulse-width-modulated (PWM) pulses corresponding to one or more dimmer levels;
    generating a first sample value and a second sample value of a plurality of sample values corresponding to duty cycles of the plurality of PWM pulses;
    determining a rate of change of the one or more dimmer levels based on the first and second sample values;
    comparing the rate of change with a threshold value to identify a mode of operation of the power supply; and
    generating a control signal for transmission to the power supply based on the identified mode of operation.

14. The power supply controller of claim 13, wherein the threshold value is a value from 3% to 7.5% of a maximum dimmer level per millisecond.

15. The power supply controller of claim 13, wherein the comparing the rate of change with the threshold value comprises:
  determining that an absolute value of the rate of change is less than or equal to the threshold value; and
  identifying the mode of operation as a slow-transition mode.

16. The power supply controller of claim 15, wherein the generating the control signal comprises:
  setting a step-rate of the control signal to a first value.

17. The power supply controller of claim 13, wherein the comparing the rate of change with the threshold value comprises:
  determining that an absolute value of the rate of change is greater than the threshold value; and
  identifying the mode of operation as a rapid-response mode.

18. The power supply controller of claim 17, wherein the generating the control signal comprises:
  setting a step-rate of the control signal to a second value.

19. A power supply system coupled to a dimmer and a light source, the power supply system comprising:
  a pulse-width-modulated (PWM) converter configured to receive a modified AC input signal from the dimmer, and to generate a PWM signal based on the modified AC input signal, the PWM signal comprising a plurality of PWM pulses; and
  a power supply controller is configured to perform:
    receiving a plurality of PWM pulses corresponding to one or more dimmer levels of the dimmer;
    generating a first sample value and a second sample value of a plurality of sample values corresponding to duty cycles of the plurality of PWM pulses;
    determining a rate of change of the one or more dimmer levels based on the first and second sample values;
    comparing the rate of change with a threshold value to identify a mode of operation of the power supply system; and
    generating a control signal based on the identified mode of operation.

20. The power supply system of claim 19, further comprising:
  a power supply configured to drive the light source based on the control signal.

* * * * *

UNITED STATES PATENT AND TRADEMARK OFFICE
CERTIFICATE OF CORRECTION

| | |
|---|---|
| PATENT NO. | : 11,122,657 B2 |
| APPLICATION NO. | : 16/905407 |
| DATED | : September 14, 2021 |
| INVENTOR(S) | : Krattiger |

It is certified that error appears in the above-identified patent and that said Letters Patent is hereby corrected as shown below:

On the Title Page

Column 1, Item (73) Assignee        Delete "ERR POWER, LLC.",
Insert --ERP POWER, LLC.--

Signed and Sealed this
Twentieth Day of September, 2022

*Katherine Kelly Vidal*

Katherine Kelly Vidal
*Director of the United States Patent and Trademark Office*